United States Patent [19]
Friedman

[11] 3,876,790
[45] Apr. 8, 1975

[54] DIHALONITROMETHYLPYRIDINES AS ANTIMICROBIALS
[75] Inventor: Henry Friedman, Indianapolis, Ind.
[73] Assignee: Eli Lilly and Company, Indianapolis, Ind.
[22] Filed: Oct. 25, 1973
[21] Appl. No.: 409,556

[52] U.S. Cl.................................. 424/263; 117/154
[51] Int. Cl............................................. A01n 9/22
[58] Field of Search .............. 424/263; 260/290 HL

[56] References Cited
UNITED STATES PATENTS
3,758,616   9/1973   Gum, Jr. et al................. 424/349 X
3,760,013   9/1973   Gum, Jr. et al................. 424/349 X OTHER PUBLICATIONS
Chem. Abst., Vol. 68 (1968), Zalukaev et al. 87112p.
Feuer et al., J. Am. Chem. Soc., 91, 1856 (1969).

Primary Examiner—Sam Rosen
Assistant Examiner—Allen J. Robinson
Attorney, Agent, or Firm—Joseph A. Jones; Everet F. Smith

[57] ABSTRACT

A class of dihalonitromethylpyridines have been discovered to be potent broad spectrum antimicrobials. The compounds, prepared from the corresponding nitronate salts, control bacteria, fungi, and protozoa.

7 Claims, No Drawings

DIHALONITROMETHYLPYRIDINES AS ANTIMICROBIALS

BACKGROUND OF THE INVENTION

This invention concerns a new method of controlling bacteria, fungi, and protozoa by contacting the microorganisms with a member of a class of dihalonitromethylpyridines.

The nitration of active methylene compounds containing an activating group such as an ester, ketone or cyano group has been previously described. See Feuer et al., *J. Am. Chem. Soc.*, 78, 4364 (1956), *Ibid.*, 81, 5826 (1959), *J. Org. Chem.*, 29, 939 (1964), *Ibid.*, 31, 3152 (1966), *Ibid.*, 34, 991 (1969); and Klager, *Ibid.*, 20, 646 (1955).

In addition, p-anisylnitromethane and its ring nitro derivatives have been prepared by Zalukajevs et al., *Latvijas P.S.R. Zinatnu Akad. Vestis*, 109, (1956). The same author also prepared α-naphthylnitromethane, *J. Gen. Chem. U.S.S.R.*, 26, 657 (1956).

Primary or secondary nitro compounds form nitronate salts which react with bromine to form bromonitro compounds. In the case of α-nitrocyclic ketones, cleavage can occur upon bromination. See Feuer et al., *J. Org. Chem.*, 29, 939 (1964), *Ibid.*, 33, 3622 (1968), *Ibid.*, 34, 991 (1969). The preparation of halo derivatives of various nitromethyl heterocycles was recently disclosed by Feuer et al., *J. Org. Chem.*, 37, 3662 (1972). Zalukajevs et al. prepared the halo derivatives of 2-nitromethylquinoline, *Zhur. Obshchei Khim.*, 28, 483 (1958).

There is no suggestion in any of the above-described publications that any of the compounds possess antimicrobial activity.

Belgian Patent 702,570 discloses 1-aryl-2-nitrohaloethanes useful in the control of bacteria, fungi and algae in water and aqueous compositions. Gum et al., U.S. Pats. Nos. 3,703,515 and 3,754,042, disclose dihalonitromethyl-substituted quinoxalines and cycloalkanes, respectively, which are said to have antimicrobial activity.

SUMMARY

This invention provides a new and superior method of killing bacteria, fungi, and protozoa which comprises contacting the microorganisms with an antimicrobially-effective amount of a dihalonitromethyl compound. The method is useful in such in vitro environments as paints, disinfecting compositions, cosmetic formulations, bodies of water and the like. The method makes use of compounds having the formula

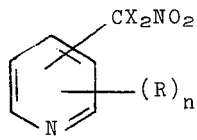

wherein X represents bromo or chloro;
each of the R groups independently represents $C_1$-$C_3$ alkyl;
$n$ represents 0-2;
provided that when the $CX_2NO_2$ group is in the 3-position, $n$ represents 0;
or the 1-oxides or hydrohalide salts thereof.

DESCRIPTION OF THE PREFERRED EMBODIMENT

The compounds used in this invention are characterized by a dihalonitromethyl group attached to a pyridine ring. When the dihalonitromethyl group is in the 3-position, it is the only ring substituent. The ring may be additionally substituted with alkyl groups when the dihalonitromethyl group is in the 2- or 4-position.

In the above formula, the term $C_1$-$C_3$ alkyl refers to alkyl groups such as methyl, ethyl, propyl, and isopropyl. The term hydrohalide salts refers to such salts as hydrochlorides, hydrobromides, and hydroiodides.

While the formula above describes the compounds unambiguously, the following specific compounds are named to assure that those skilled in the art understand the scope of the invention.

2-dichloronitromethyl-3-picoline
2-dibromonitromethyl-3-ethylpyridine
4-dichloronitromethyl-2,6-diethylpyridine
2-dichloronitromethyl-4-isopropylpyridine
3-dichloronitromethylpyridine
4-dibromonitromethylpyridine
3-dibromonitromethylpyridine-1-oxide
4-dibromonitromethyl-3,5-lutidine hydrochloride
4-dichloronitromethyl-2-propylpyridine hydrobromide
2-dibromonitromethyl-4-picoline hydroiodide
2-dibromonitromethyl-3-propylpyridine
2-dibromonitromethyl-4-ethylpyridine
2-dibromonitromethyl-4-picoline hydrobromide
2-dichloronitromethyl-3,5-dipropylpyridine The compounds with which this invention is preferably carried out are 6-dibromonitromethyl-2-picoline, 6-dichloronitromethyl-2-picoline, 4-dichloronitromethyl-3-picoline, 4-dichloronitromethylpyridine, and 4-dichloronitromethylpyridine-1-oxide.

The pyridines used in this invention are easily prepared in a two-step synthesis from picolines which are commercially available or can be prepared using known procedures in the chemical literature.

Compounds bearing the diahlonitromethyl group at the 2- or 4-position are made differently than the 3-substituted compounds. The first step of the synthesis of 2- and 4-substituted compounds is the formation of a nitronate salt having the formula $$Q - CH = NO_2^- M^+$$

wherein Q represents the pyridine ring, and M represents alkali metal, preferably potassium.

Nitronate salts are formed by the procedure of Feuer et al., *J. Am. Chem. Soc.*, 91, 1856 (1969), wherein a picoline is treated with an alkali metal amide and liquid ammonia, followed by n-propyl nitrate as the nitrating agent. Alternatively, such salts can be made by treating a picoline with a nitrating agent in the presence of butyllithium and tetrahydrofuran. Both processes are carried out at low temperatures from about −75° to −30°C.

Either process forms nitronate salts of picolines having only one methyl group. The metal amide process is preferential forr the 4-position, however, and the butyllithium process is preferential for the 2-position, when both positions are available. Either salt of a 2,4-lutidine can therefore be made by choosing the right process.

The 3-dihalonitromethylpyridines useful in this invention are prepared by a method described by Feuer et al., *J. Org. Chem.*, 37, 3662 (1972). A 3-pyridyl acetate is nitrated in liquid ammonia and acetic acid with potassium amide and an alkyl nitrate at about −50° to −30°C. to produce 3-nitromethylpyridine.

The nitronate salts, and the 3-nitromethylpyridines as well, are converted to the dihalonitromethyl compounds by treatment with a halogenating reagent. Dichloro compounds can be prepared by treating the intermediate with an agent such as potassium hypochlorite at a temperature between −10°C. and 20°C. The corresponding dibromo compounds are best prepared by treatment with bromine in potassium hydroxide solution under similar conditions. The use of a two-fold excess of the halogenating reagent forms the dihalonitro compound, usually in less than one hour.

The pyridine 1-oxides used in this invention are easily prepared by using the corresponding picoline 1-oxides as starting compounds. The oxide has no effect on the synthesis of the dihalonitromethyl compounds.

Hydrohalide salts of the compounds are easily prepared by the methods usually used for preparing salts. For example, the dihalonitromethyl compound can be dissolved in ether, and contacted with the anhydrous hydrohalide. Hydrohalides can also be made by contacting the compound with the corresponding acids in solvents such as aqueous alcohols or aqueous acetone.

The preparative examples below illustrate the methods by which the compounds are made, and are not intended to limit the scope of the invention in any way. The first two examples show the synthesis of typical nitronate salts.

EXAMPLE 1

Lithium 2-methyl-4-picolinenitronate

A 10.7 g. portion of 2,4-lutidine was dissolved in 250 ml. of dry tetrahydrofuran and the solution was cooled to about −50°C. Then about 0.10 mole of n-butyllithium in about 50 ml. of tetrahydrofuran was added at a rate such that the temperature of the mixture did not rise above −50°C. The reaction mixture was then stirred for two hours at −55°C. A 20.9 g. portion of n-propyl nitrate was then added at a rate such that the temperature remained below −50°C. during the addition. After the mixture was warmed to room temperature, the solvent was removed under vacuum and dry ether was added. The solids which did not dissolve in the ether were collected, washed with more ether, and vacuum dried. The yield was 8.4 g. of lithium 2-methyl-4-picolinenitronate in a sufficiently pure form for use in the halogenation step without further purification.

EXAMPLE 2

Sodium 4-methyl-2-picolinenitronate

Liquid ammonia, 250 ml., was added to a flask equipped with a stirrer, thermometer, and Dry Ice condenser. A 5.3 g. portion of sodium was added in small pieces and dissolved, followed by a catalytic amount of ferric nitrate hydrate. While the mixture was stirred and kept below −35°C., 16.1 g. of 2,4-lutidine was added. The mixture was then stirred for 15 minutes, and 31.2 g. of n-propyl nitrate was then added, holding the temperature below −35°C. The ammonia was then allowed to evaporate and was replaced with ether. The solids which formed were collected by filtration and washed with ether. The yield was 28.4 g. of sodium 4-methyl-2-picolinenitronate.

The intermediate compounds are converted to the antimicrobial dihalonitromethylpyridines by processes typified by the following example.

EXAMPLE 3

4-dichloronitromethyl-2-picoline

A 5.0 g. portion of sodium 4-methyl-2-picolinenitronate was dissolved in 50 ml. of water and the solution was filtered. The solution was then added dropwise to 83 ml. of 2.2 molar potassium hypochlorite at 5°–10°C. An oily phase formed which was extracted from the aqueous phase with ether. The ether extract was dried over magnesium sulfate, and evaporated under vacuum leaving a yellow oil. The oil was chromatographed over silica gel with 2:1 benzene:ethyl acetate. The yield, after the product-containing fractions were evaporated under vacuum, was 2.40 g. of 4-dichloronitromethyl-2-picoline (XIV), an oily liquid. Identity of the compound was confirmed by nuclear magnetic resonance analysis and elemental analysis.

The following exemplary compounds were made by the processes of Examples 1–3 with small modifications which can readily be supplied by one skilled in the art.
6-dibromonitromethyl-2-picoline (I), m.p. 48°–51°C.
6-dichloronitromethyl-2-picoline (II), oil
2-dichloronitromethyl-5-ethylpyridine (III), oil
4-dichloronitromethylpyridine (IV), oil
4-dichloronitromethyl-3-picoline (V), oil
4-dichloronitromethylpyridine-1-oxide (VI), oil
2-dibromonitromethylpyridine-1-oxide (VII), m.p. 161°–168°C.
4-dibromonitromethylpyridine-1-oxide (VIII), m.p. 98°–102°C.
2-dichloronitromethylpyridine-1-oxide (IX), m.p. 113°–116°C.
4-dichloronitromethylpyridine hydrochloride (X), softened 145°C.; dec. at 240°C.
4-dibromonitromethyl-2-picoline hydrochloride (XI), m.p. 126°–128°C. dec.
4-dichloronitromethyl-2,6-lutidine hydrochloride (XII), softened 145°C.; dec. at 210°C.
4-dichloronitromethyl-2,6-lutidine (XIII), m.p. 36°–38°C.
4-dibromonitromethyl-2-picoline (XV), m.p. 103°–105°C.
4-dibromonitromethyl-2,6-lutidine (XVI), m.p. 85°–90°C.
2-dichloronitromethyl-4-picoline (XVII), oil 2-dibromonitromethyl-4-picoline (XVIII), oil
2-dichloronitromethyl-4,6-lutidine (XIX), m.p. 57°–59°C.
2-dibromonitromethyl-4,6-lutidine (XX), m.p. 76°–78°C.
4-dibromonitromethylpyridine (XXI), m.p. 92°–94°C.

The invention described here is a method of killing bacteria, protozoa, and fungi in vitro which comprises contacting the microorganisms with a compound described above. The method is effective in many different ways, and those skilled in the microbiological arts are aware of a great variety of ways in which the method can be advantageously applied.

The environment in which the microorganisms are killed in vitro may be any environment suitable for the growth of the microorganisms, away from a living host. For example, the method can be applied by adding the compounds described above to bodies of water such as cooling towers and ponds, lagoons, lakes and the like for the control of protozoa and slime-forming bacteria and fungi. Another desirable variant of the method is the addition of the compounds to such compositions as animal feed, adhesives, inks, plasticizers, latices, polymers, resins, fuels, lubricants, soaps and detergents, cutting oils, and paints to prevent the growth of mold and the degradation of the products which results from attack by microorganisms.

Another useful variant of the method is the use of the compounds as coatings or impregnants for products such as textiles, paper and other cellulose products, wood, and wall panelings and plaster to protect such substances from mold and decay caused by microbial infestation. The method is especially useful for the preservation of such products as cosmetic formulations.

Further, a particularly useful variation of the method of killing such microorganisms is the use of the compounds as disinfectants and sterilizing agents for surfaces such as floors, walls, hospital equipment, kitchen equipment and the like.

As the examples below indicate, the new compounds are effective at very low concentrations. In general, the compounds are used in the practice of the microbiocidal method in concentrations of from about 0.1 ppm. to about 100 ppm.

In many cases, no special formulation of the new compounds is necessary to use them in the microbiocidal method. The compounds may be simply added to the environment in which bacteria, fungi, or algae are to be killed, usually with adequate mixing. For example, the compounds may be added to and intimately blended with the other ingredients of such compositions as adhesives, polymers, paints, cosmetics, and the like. When the compounds are to be dispersed in a body of water, as for use in cooling water, or are to be used as a coating on paper or the like, it is desirable to prepare a liquid formulation of the compound. Such a formulation, well known in the art, is readily prepared by dissolving the compound in water or an organic solvent, to which surface-active agents such as alkyl-benzenesulfonates, alkyl sulfates, sorbitan esters, and ethylene oxide adducts of alkylphenol may be advantageously added.

At times, it is difficult to find a solvent for the desired compound which is acceptable in the environment to be protected from microorganisms. In such cases, it is appropriate to make a powdered formulation of the compound. Such a formulation is easily prepared by making an intimately mixed, finely powdered mixture of the compound with dispersing agents, such as naphthalenesulfonates or ligninsulfonates, to which a surface-active agent such as those described above may be added. Inert fillers such as finely divided clays may also be used in some instances. Such formulations disperse easily through liquid environments, or disperse evenly over a solid environment, and thereby effectively bring the active compound into contact with microorganisms which may be present in the environment. Use of such easily dispersing powders also hastens the dissolution of the compound in the environment, thereby allowing the compound to come into contact still more readily with microorganisms.

The method of this invention is also effective against a number of aquatic weeds. For example, application of 10 ppm. of 4-dichloronitromethyl-2,6-lutidine hydrochloride to a body of water killed or effectively controlled the noxious weeds hydrilla, coontail, and duckweed. Similar effects were also produced by, for example, 2-dichloronitromethyl-4-picoline hydrochloride, and 2-dibromonitromethyl-6-picoline.

The example below reports the results of testing a representative group of the compounds in a broad-spectrum antimicrobial screen.

EXAMPLE 4

In vitro agar dilution test

Bacteria and fungi in an agar medium were stamped on a plate to which one drop of a 100 μg./ml. or a 10 μg./ml. solution of the compound was surface applied. The agar plates were then incubated at 35°C. for 12 hours, at which time the antibacterial activities were evaluated. The fungi were incubated at 25°C. for an additional 60 hours before evaluation. The procedure was essentially that recommended in *Acta Pathol. Microbiol. Scand. B.*, Suppl. 217, 11 (1971). A rating of 100 indicates that the compound prevented growth of the microbe at 100 μg./ml. and 10 indicates prevention at the 10 μg./ml. level. NT indicates the compound was not tested for activity against an organism, while a blank space indicates the compound was not active at the highest level tested (100 μg./ml.).

| Compound | Staphylococcus aureus | Streptococcus faecalis | Proteus | Salmonella typhosa | Klebsiella-aerobacter sp. KA14 | Klebsiella-aerobacter sp. KA17 | Escherichia coli | Pseudomonas aeruginosa | C-476 | Salmonella typhimurium | Pseudomonas solanacearum | Erwinia amylovora | Xanthomonas phaseoli | Candida tropicalis | Trichophyton mentagrophytes | Botrytis cinerea | Ceratocystis ulmi | Fusarium oxysporum F. lycopersici | Verticillium albo-atrum |
|---|---|---|---|---|---|---|---|---|---|---|---|---|---|---|---|---|---|---|---|
| I | 10 | 10 | 10 | 10 | 10 | 10 | 10 | 10 | 10 | 10 | 10 | 10 | 10 | 100 | 10 | 10 | 10 | 10 | 10 |
| II | 10 | 10 | 10 | 100 | 10 | | 10 | | 100 | | 100 | 100 | | | 10 | 10 | 100 | 100 | 10 |
| IV | 10 | 100 | 100 | 10 | 100 | 100 | 10 | | 10 | 100 | 100 | 10 | 10 | 10 | 10 | 10 | 10 | 10 | 10 |
| XIII | 10 | 100 | 10 | | 100 | 100 | 100 | | 100 | | | | | | 100 | 10 | 10 | 10 | 10 |
| XXI | 100 | 100 | 100 | 100 | 100 | 100 | 100 | 100 | 100 | 100 | 100 | 100 | 10 | 100 | 100 | 100 | 100 | 100 | 100 |

| Compound | Staphylococcus aureus 3055 | Staphylococcus aureus 3074 | Streptococcus faecalis X66 | Proteus morganii PR15 | Salmonella typhosa SA12 | Klebsiella pneumoniae Kl14 | Enterobacter aerogenes EB17 | Serratia marcescens SE3 | Escherichia coli EC14 | Citrobacter freundii CF17 | Pseudomonas aeruginosa X239 | Bordetella bronchiseptica 16 | Salmonella typhimurium | Pseudomonas solanacearum X185 | Erwinia amylovora | Candida tropicalis A17 | Trichophyton mentagrophytes 27 | Aspergillus flavus E | Ceratocystis ulmi |
|---|---|---|---|---|---|---|---|---|---|---|---|---|---|---|---|---|---|---|---|
| III | 10 | 10 | 100 | | | | | | | | | 100 | | | 100 | 10 | 100 | 100 | 100 |
| V | 100 | 10 | 100 | 100 | 10 | 10 | 10 | | 100 | | 100 | 100 | 10 | 10 | 10 | 100 | 10 | 10 |
| VI | 10 | 10 | 100 | 10 | 10 | 10 | 10 | 10 | 10 | 10 | | 10 | 10 | 10 | 10 | | 100 | 10 | 10 |
| VII | 100 | 100 | 100 | 100 | 100 | 100 | 100 | 100 | 100 | 100 | 100 | 100 | 100 | 100 | 100 | 100 | 100 | 100 | 100 |
| VIII | 100 | 10 | 100 | 100 | 10 | 10 | 10 | 100 | 100 | 100 | 100 | 10 | 10 | 100 | 10 | 10 | 100 | 100 | 100 |
| XII | 10 | 10 | 100 | | 100 | | 100 | | | | | | | | 10 | 10 | 10 | 10 | 100 |
| XV | 100 | 100 | 100 | 100 | 100 | 100 | 100 | 100 | 100 | 100 | 100 | 100 | 100 | 100 | 100 | 100 | 100 | 100 | 100 |
| XVI | 100 | 100 | 100 | 100 | 100 | 100 | 100 | 100 | 100 | 100 | 100 | 100 | 100 | 100 | 100 | 100 | 100 | 100 | 100 |
| XVII | 100 | 100 | | | | | | | | | | | | | | 10 | 100 | 10 | 10 |
| XVIII | 10 | 100 | 100 | 100 | 100 | | | 100 | 100 | | | 100 | 100 | | 100 | 100 | 100 | 10 | 10 |
| XIX | 10 | 10 | | | | | | | | | | 100 | | | | 100 | 100 | | 100 |
| XX | 10 | 10 | 100 | 100 | 100 | | | | | | | 100 | | | | | 100 | | 10 |

The example below reports representative results of testing the compounds in a slightly different in vitro test against a different group of microorganisms.

EXAMPLE 5

In vitro tube dilution test

The organisms against which the compounds were to be tested were grown in nutrient broth in test tubes under sterile conditions. One hundred μg./ml. of the compound to be tested was added to a tube of broth, and the treated broth was serially diluted with untreated broth in which the culture had been inoculated. The tubes were observed, and the results for each compound were recorded as the lowest concentration, in micrograms per milliliter, in which the compound prevented the growth of the microorganism.

| Compound | Staphylococcus sp. 1130 | Streptococcus sp. 80 | Vibrio coli | Mycoplasma gallisepticum | Escherichia coli | Salmonella dublin | Pseudomonas sp. | Pasteurella multocida | P. multocida turkey isolate | Bordetella | Mycoplasma synoviae | M. hyorhinis | M. granularum |
|---|---|---|---|---|---|---|---|---|---|---|---|---|---|
| I | 25 | 25 | 25 | 12.5 | 50 | 50 | 50 | 25 | 25 | 50 | 25 | 25 | 12.5 |
| II | ≤1.56 | 6.25 | 3.12 | ≤1.56 | 25 | 12.5 | 50 | ≤1.56 | ≤1.56 | 50 | ≤1.56 | 6.25 | ≤1.56 |
| III | 50 | 25 | 6.25 | 50 | >50 | >50 | >50 | 1.56 | <0.78 | >50 | 6.25 | 25 | 12.5 |
| IV | 3.12 | 6.25 | | 12.5 | 3.12 | 3.12 | 50 | <1.56 | <1.56 | <1.56 | 6.25 | | |
| V | 3.12 | 3.12 | 3.12 | 6.25 | 3.12 | 3.12 | 50 | <1.56 | <1.56 | 3.12 | 25 | 12.5 | |
| VI | 12.5 | 6.25 | 12.5 | 6.25 | 12.5 | 12.5 | 50 | 3.12 | 6.25 | 25 | 25 | 25 | |
| VII | 50 | 50 | 25 | 50 | >50 | >50 | >50 | 50 | 50 | 50 | 50 | 50 | |
| VIII | >50 | 50 | 50 | >50 | >50 | >50 | 50 | 50 | 50 | 50 | >50 | >50 | |
| IX | 12.5 | 6.25 | 6.25 | 6.25 | 12.5 | 6.25 | 50 | 3.12 | 3.12 | 12.5 | 12.5 | 25 | |
| XIII | ≤1.56 | 6.25 | ≤1.56 | ≤1.56 | 6.25 | 25 | >50 | ≤1.56 | ≤1.56 | 25 | 3.12 | 25 | ≤1.56 |
| XV | 25 | 50 | 50 | 12.5 | >50 | >50 | 50 | 50 | 50 | 50 | 25 | 25 | 50 |
| XVI | 50 | 50 | 50 | 12.5 | >50 | >50 | >50 | 50 | 50 | >50 | 25 | 25 | |
| XVII | 25 | 12.5 | 1.56 | 25 | 50 | 50 | >50 | 1.56 | 3.12 | 50 | 3.12 | 25 | 6.25 |
| XIX | 25 | 50 | 6.25 | 25 | >50 | >50 | >50 | 1.56 | 6.25 | >50 | 3.12 | 12.5 | 25 |
| XX | 50 | 50 | 25 | 25 | >50 | >50 | >50 | 25 | 6.25 | >50 | | 50 | 25 |
| XXI | 50 | 50 | 25 | 50 | >50 | >50 | >50 | 25 | 25 | >50 | 25 | 25 | 25 |

A generally similar test was performed to evaluate some representative compounds against additional species of fungi.

EXAMPLE 6

In vitro antifungal test

| Compound No. | Trichophyton mentagrophytes | Candida albicans |
|---|---|---|
| II | 0.2 μg./ml. | 20.0 μg./ml. |
| VI | 2.0 | 2.0 |
| VII | >2.0 | 20.0 |
| XIV | 0.02 | 2.0 |
| XV | 0.2 | 20.0 |
| XVI | 2.0 | 20.0 |
| XXI | >2.0 | 20.0 |

In a different antifungal test, the compounds to be tested were absorbed on paper discs, and the discs were laid on plates of fungus-infected agar medium. The results were reported as the least amount of compound per disc which produced a measurable inhibition of the fungus.

| Compound No. | Trichophyton mentagrophytes | Candida albicans |
|---|---|---|
| I | 0.625 μg./disc | 0.156 μg./disc |

Representative compounds of this invention were tested in vitro to determine their ability to control protozoa and algae. The examples below report the results of such tests.

EXAMPLE 7

In vitro protozoa inhibition tests

The tests were run against four representative protozoa, *Tetrahymena pyriformis* (T), *Ochromonas malhamensis* (O), *Euglena gracilis* (E), and *Trichomonas vaginalis* (TV). The protozoa were grown in the laboratory in nutritive media. When a test was to be run, nutritive medium containing the test protozoa was mixed with sterile agar medium, and the mixed medium poured into plates.

Absorbent discs were treated with 0.02 ml. of a solution containing a known concentration of the compound to be tested. The concentrations used are indicated in the table below. The discs were placed on the surfaces of the protozoacontaining agar plates.

The plates were incubated for a time, and were then inspected to determine if the test compound absorbed on the discs had inhibited the growth of the protozoa. Inhibition, if present, was measured as the diameter in millimeters of the zone of inhibition around the disc.

The table below reports the zones of inhibition produced by representative compounds of this invention. The notation TR indicates that the compound gave a trace of inhibition. NT indicates that the compound was not tested against a given organism, and a blank space indicates that the compound was inactive.

| Compound No. | Conc. | T | O | E | TV |
|---|---|---|---|---|---|
| I | 2000 | 20 | 20 | 18 | |
| | 500 | 12 | 13 | 10 | |
| | 125 | | 10 | | |
| II | 2000 | 18 | 15 | 13 | 13 |
| | 500 | 12 | TR | TR | |
| | 125 | TR | | | |
| IV | 2000 | 34 | NT | 25 | 26 |
| | 500 | 18 | NT | 12 | 13 |
| | 125 | TR | NT | TR | |
| XIII | 2000 | 25 | 17 | 18 | 15 |
| | 500 | 15 | 14 | 10 | |
| | 125 | 12 | | TR | |
| XIV | 2000 | 23 | 13 | 15 | |
| | 500 | 11 | TR | TR | |
| XV | 2000 | 26 | 30 | 32 | TR |
| | 500 | 11 | 15 | 10 | |
| | 125 | | TR | | |
| XVI | 2000 | 24 | 22 | 23 | 10 |
| | 500 | 13 | 14 | 10 | |
| XXI | 2000 | 30 | NT | 17 | 17 |
| | 500 | 10 | NT | TR | |
| | 125 | | NT | | |

EXAMPLE 8

In vitro algae inhibition test

The activity of representative compounds against a typical alga was determined by conducting a test substantially identical to the test described above against *Chlorella vulgaris*. The results are reported below.

| Compound No. | Conc. | Chlorella |
|---|---|---|
| I | 2000 | 31 |
| | 500 | 20 |
| | 125 | TR |
| II | 2000 | TR |
| | 500 | |
| | 125 | |
| XIII | 2000 | 32 |
| | 500 | 13 |
| | 125 | TR |
| XIV | 2000 | 30 |
| | 500 | 12 |
| XV | 2000 | 50 |
| | 500 | 20 |
| | 125 | TR |
| XVI | 2000 | 32 |
| | 500 | 18 |

The following tests showed the ability of typical compounds of the invention to eradicate established microorganisms.

EXAMPLE 9

In vitro eradication test

Aqueous dispersions of several compounds of this biocidal method were inoculated with known concentrations of organisms which are named below. Counts of the viable organisms per milliliter were made initially. The cultures were then incubated at 25°C. and counted on subsequent days as shown in the tables below. The notation NC indicates that the organism was not counted on that day.

The compound 6-dibromonitromethyl-2-picoline was tested with the following results.

0.1% of Compound

| Days | Pseudomonas aeruginosa | Aspergillus niger |
|---|---|---|
| 0 | $5.5 \times 10^6$ | $3.5 \times 10^4$ |
| 1 | <100 | <100 |
| 7 | <100 | <100 |
| 28 | <100 | <100 |

The hydrochloride of the above compound was also tested.

0.1% of Compound

| Days | Pseudomonas aeruginosa | Aspergillus niger |
|---|---|---|
| 0 | <1000 | $5.8 \times 10^5$ |
| 1 | <100 | $5.0 \times 10^2$ |
| 7 | <100 | <100 |
| 14 | NC | <100 |
| 28 | <100 | <100 |

Another compound effective in the new method, 4-dichloronitromethyl-2,6-lutidine hydrochloride, was also tested.

0.1% of Compound

| Days | Pseudomonas aeruginosa | Aspergillus niger |
|---|---|---|
| 0 | $2.4 \times 10^6$ | $6.2 \times 10^5$ |
| 1 | <100 | <100 |
| 7 | <100 | <100 |
| 28 | <100 | <100 |

A similar test against a broader range of microorganisms was performed with 6-dibromonitromethyl-2-picoline as the test compound. In this test, the fungi were inoculated in Sabouraud dextrose agar, and the bacteria in soybean-casein medium. The test was otherwise similar to the test described immediately above.

One particularly useful embodiment of this invention is the preservation from deterioration by microorganisms of compositions such as cosmetic and pharmaceutical formulations. The tests reported in the example below demonstrate the value of the compounds of the present method in such preservation.

EXAMPLE 10

Cosmetic base cream preservation test

The creams used as substrates for the tests reported here were typical cosmetic creams composed of approximately 25 percent of heavy mineral oil and about 60 percent of water, with small percentages of cetyl alcohol, wax, and lanolin. Creams were tested which were emulsified with both anionic and nonanionic surfactants.

The first tests to be reported were of the compound 6-dibromonitromethyl-2-picoline.

0.1% of Compound

| Days | Staphylococcus aureus | Escherichia coli | Pseudomonas aeruginosa | Candida albicans | Aspergillus niger | Streptococcus faecalis |
|---|---|---|---|---|---|---|
| 0 | $4.3 \times 10^6$ | $8.3 \times 10^6$ | $4.3 \times 10^6$ | $3.1 \times 10^5$ | $3.9 \times 10^5$ | $2.4 \times 10^6$ |
| 1 | <100 | <100 | <100 | <100 | $3.4 \times 10^5$ | <100 |
| 7 | <100 | <100 | <100 | <100 | $7 \times 10^2$ | <100 |
| 14 | NC | NC | NC | NC | <100 | NC |
| 21 | NC | NC | NC | NC | <100 | NC |
| 28 | <100 | <100 | <100 | <100 | <100 | <100 |

0.05% of Compound

| Days | Staphylococcus aureus | Escherichia coli | Pseudomonas aeruginosa | Candida albicans | Aspergillus niger | Streptococcus faecalis |
|---|---|---|---|---|---|---|
| 0 | $5.0 \times 10^6$ | $7.3 \times 10^6$ | $5.0 \times 10^6$ | $1.2 \times 10^6$ | $3.8 \times 10^5$ | $2.5 \times 10^6$ |
| 1 | <100 | <100 | <100 | <100 | $4.3 \times 10^5$ | <100 |
| 7 | <100 | <100 | <100 | <100 | $3.0 \times 10^2$ | <100 |
| 14 | NC | NC | NC | NC | <100 | NC |
| 21 | NC | NC | NC | NC | <100 | NC |
| 28 | <100 | <100 | $1.0 \times 10^5$ | <100 | <100 | <100 |

0.1% in Anionic Cream

| Days | Staphylococcus aureus | Escherichia coli | Pseudomonas aeruginosa | Candida albicans | Aspergillus niger | Aspergillus flavis | Streptococcus faecalis |
|---|---|---|---|---|---|---|---|
| 0 | $1.5 \times 10^7$ | $8.8 \times 10^5$ | $8.5 \times 10^5$ | $1.0 \times 10^6$ | $6.0 \times 10^8$ | $1.7 \times 10^9$ | $1.1 \times 10^7$ |
| 1 | <100 | <100 | $1 \times 10^3$ | <100 | $4.7 \times 10^4$ | $4 \times 10^2$ | <100 |
| 7 | <100 | <100 | <100 | <100 | <100 | <100 | <100 |
| 14 | NC | NC | <100 | NC | <100 | <100 | NC |
| 28 | <100 | <100 | <100 | <100 | <100 | <100 | <100 |

0.05% in Nonionic Cream

| Days | Staphylococcus aureus | Escherichia coli | Pseudomonas aeruginosa | Candida albicans | Aspergillus niger | Aspergillus flavis | Streptococcus faecalis |
|---|---|---|---|---|---|---|---|
| 0 | $9.0 \times 10^6$ | $3.9 \times 10^6$ | $4.4 \times 10^6$ | $3.0 \times 10^6$ | $6.0 \times 10^5$ | $4.0 \times 10^5$ | $5.0 \times 10^6$ |
| 1 | <100 | <100 | <100 | <100 | $2.5 \times 10^4$ | $4.5 \times 10^3$ | $6 \times 10^2$ |
| 7 | <100 | <100 | <100 | <100 | $1.9 \times 10^5$ | <100 | <100 |
| 14 | NC | NC | NC | NC | $1.1 \times 10^5$ | <100 | <100 |
| 21 | NC | NC | NC | NC | $2.0 \times 10^3$ | NC | NC |
| 28 | <100 | <100 | <100 | <100 | $4.0 \times 10^2$ | <100 | <100 |

Similar tests were also performed with 4-dichloronitro-methyl-2,6-lutidine hydrochloride.

0.1% in Anionic Cream

| Days | Pseudomonas aeruginiosa | Aspergillus niger |
| --- | --- | --- |
| 0 | <1000 | $1.0 \times 10^6$ |
| 1 | <100 | $4.6 \times 10^5$ |
| 7 | <100 | <100 |
| 14 | NC | <100 |
| 28 | <100 | <100 |

0.1% in Nonionic Cream

| Days | Pseudomonas aeruginosa | Aspergillus niger |
| --- | --- | --- |
| 0 | $7.8 \times 10^6$ | $2.1 \times 10^6$ |
| 1 | $1.7 \times 10^4$ | $4.6 \times 10^5$ |
| 7 | <100 | $4.4 \times 10^4$ |
| 14 | <100 | $7.3 \times 10^3$ |
| 21 | NC | $1.8 \times 10^3$ |
| 28 | <100 | $2.0 \times 10^3$ |

I claim:

1. A method of killing microbes selected from the group consisting of bacteria, fungi, and protozoa in vitro which comprises contacting the bacteria, fungi, and protozoa with an antimicrobially-effective amount of a compound of the formula

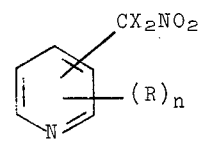

wherein X represents bromo or chloro;

each of the R groups independently represents $C_1$–$C_3$ alkyl;

$n$ represents 0–2;

provided that when the $CX_2NO_2$ group is in the 3-position, $n$ represents 0;

or the 1-oxides or hydrohalide salts thereof.

2. The method of claim 1 wherein the amount of the compound is from about 0.1 ppm. to about 100 ppm.

3. The method of claim 2 wherein the compound is 6-dibromonitromethyl-2-picoline.

4. The method of claim 2 wherein the compound is 6-dichloronitromethyl-2-picoline.

5. The method of claim 2 wherein the compound is 4-dichloronitromethylpyridine.

6. The method of claim 2 wherein the compound is 4-dichloronitromethylpyridine-1-oxide.

7. The method of claim 2 wherein the compound is 4-dichloronitromethyl-3-picoline.

* * * * *